3,458,599
PRODUCTION OF UNSATURATED GRAFT COPOLYMERS FROM ISOBUTYLENE POLYMERS
Guenther Daumiller, Ziegelhausen, Ernst-Guenther Kastning, Assenheim, Pfalz, and Herbert Naarmann, Ludwigshafen (Rhine), Germany, assignors to Badische Anilin- & Soda-Fabrik Aktiengesellschaft, Ludwigshafen (Rhine), Germany
No Drawing. Filed Oct. 4, 1966, Ser. No. 584,107
Claims priority, application Germany, Oct. 23, 1965, B 84,236
Int. Cl. C08d 9/04; C08f 15/04
U.S. Cl. 260—879          2 Claims

ABSTRACT OF THE DISCLOSURE

Process for the production of unsaturated graft copolymers in which 1,3-dienes are grafted onto isobutylen polymers containing halogen atoms, using as catalysts a combination of Lewis acids and Ziegler-Natta catalysts. The graft polymers are compatible with natural or synthetic rubber and can be easily vulcanized to give homogeneous products.

---

The present invention relates to a process for the production of unsaturated graft polymers from isobutylene polymers by grafting 1,3-dienes onto isobutylene polymers.

It is known that isobutylene can be copolymerized with isoprene, 2,3-dimethylbutadiene or butadiene. Not more than about 5% by weight of the diolefins however participate in the copolymerization. The small proportion of unsaturated groups in the isobutylene copolymers obtained results in very poor vulcanization behavior—vulcanization temperatures of 150° to 200° C. are necessary as against 100° to 140° C. in the case of conventional polydiene rubbers—and consequently in very unsatisfactory properties of the vulcanized products. Since the known isobutylene copolymers cannot be used as rubbers because of their inadequate vulcanizability, attempts have been made to mix them with polydiene rubbers, e.g., polybutadiene; copolymers of butadiene with styrene and acrylonitrile; or natural rubber. Satisfactory results are however not obtained in this case either because the said isobutylene copolymers have only poor compatibility with polydiene rubbers.

It is also known from British patent specification No. 878,150 to graft dienes, such as butadiene, onto copolymers of butadiene with isobutylene, isoprene or isobutylene using catalysts forming free radicals. This process results in inhomogeneous vulcanizates having inferior mechanical properties.

We have now found that unsaturated graft polymers can be prepared from isobutylene polymers by grafting 1,3-dienes onto isobutylene polymers, which graft polymers have good compatibility with natural or synthetic rubber and which can be easily vulcanized to give homogeneous products, when reaction products of isobutylene polymers containing halogen atoms and Lewis acids are reacted with 1,3-dienes.

For example in the process according to this invention, a halogenated polyisobutylene is reacted with a Lewis acid, the Lewis acid forming complexes with the halogenated polyisobutylene, at the sites (s.) where the halogen atoms are situated. The resultant reaction product (complex) is then reacted with a 1,3-diene, the 1,3-diene being grafted on at the said sites (s.).

In addition to the Lewis acids Ziegler-Natta catalysts can be employed in the new process in order to favor a specific configuration in the polymer chain which is being grafted on.

Isobutylene polymers containing halogen atoms which are suitable for the process according to this invention usually have a halogen content of 0.0001 to 50%, preferably 0.1 to 10%, by weight. Their K value is in general from 15 to 200, preferably from 50 to 150. Chlorine and bromine are preferred as halogens but isobutylene polymers containing iodine atoms are also very suitable.

The isobutylene polymers containing halogen atoms are derived from isobutylene polymers (i.p.) which in general contain at least 80% by weight of polymerized isobutylene units. The isobutylene polymers (i.p) may for example contain in addition to isobutylene units polymerized units of butadiene, isoprene, styrene, α-methylstyrene and/or vinyl ethers, such as ethyl vinyl either and vinyl isobutyl ether. Copolymers of isobutylene and isoprene, which contain about 5% by weight of polymerized units of isoprene and which are commercially available for example as butyl rubber, as well as commercially available homopolymers of isobutylene having K values of from about 50 and 200 are very suitable as starting materials for the isobutylene polymers containing halogen atoms.

The isobutylene polymers containing halogen atoms can easily be obtained from such isobutylene polymers (i.p.) by halogenation by conventional methods. Examples of suitable isobutylene polymers containing halogen are a brominated homopolymer of isobutylene having a K value of about 150, which contains 2% by weight of bromine; a chlorinated butyl rubber which contains 5% by weight of chlorine and 5.6% by weight of polymerized isoprene units; a brominated butyl rubber having a bromine content of 2% by weight which contains 5.7% by weight of polymerized butadiene units; an iodinated copolymer of isobutylene and α-methylstyrene having an iodine content of 0.7% by weight and a K value of about 110 which contains 10% by weight of polymerized α-methylstyrene units; and a chlorinated homopolymer of isobutylene having a K value of about 80 and a chlorine content of 24% by weight.

Aliphatic diolefins having conjugated double bonds of which one is terminal and having four to ten carbon atoms are particularly suitable as 1,3-dienes for the process. Examples of these are butadiene, isoprene and chloroprene. These 1,3-dienes may be used in the process either alone or mixed with each other. Isoprene and particularly butadiene are preferred. The 1,3-dienes may also be reacted in the process mixed with styrene, α-methylstyrene and vinyl ethers, such as ethyl vinyl ether, n-propyl vinyl ether, isobutyl vinyl ether, n-hexyl vinyl ether. The proportion of 1,3-diene is preferably at least 50% by weight on the whole of the monomers.

Examples of suitable Lewis acids are aluminum chloride, aluminum bromide, aluminum iodide, phosphorus trichloride, phosphorus pentachloride, phosphorus oxychloride, sulfuric acid, perchloric acid as well as halides of germanium, tin, lead, arsenic, antimony and bismuth and the halides of the elements of Groups IIIa, IIIb, IVb, Va, Vb, VIb, VIIb and VIII of the Periodic System of Elements (according to Handbook of Chemistry and Physics, 38th edition, Chemical Rubber Publishing Co., Cleveland, Ohio, pages 394 and 395). Examples are lanthanum trichloride, gallium tribromide, titanium tetrachloride, titanium tetraiodide, zirconium oxychloride, zirconium tetrachloride, tin tetrachloride, niobium pentachloride, vanadium tetrachloride, vanadium oxychloride, arsenic pentachloride, chromium trichloride, uranium hexafluoride, molybdenum tetrachloride, manganese tetrachloride, iron (III) chloride. Mixtures of these Lewis acids may also be used.

Examples of suitable Ziegler-Natta catalysts are mixtures of diethyl aluminum chloride and cobalt (II) acetylacetonate; triethyl aluminum and vanadium tetrachloride;

triisobutyl aluminum and titanium tetraiodide or chromium (III) acetylacetonate, if desired with modifying agents, such as small amounts of ethanol or traces of water.

The Lewis acids are generally used in amounts of 0.001 to 5% by weight on the isobutylene polymer containing halogen atoms.

The amount and type of Ziegler-Natta catalyst depend on the amount of 1,3-diene to be grafted on and the desired configuration of the side chains. In general 0.0001 to 5%, particularly 0.01 to 0.1%, by weight of Ziegler-Natta catalyst, on the isobutylene polymer containing halogen atoms, is adequate.

In the process according to the invention, the isobutylene polymer containing halogen atoms may for example be placed in a reactor, with or without the addition of indifferent diluents, such as aromatic, cycloaliphatic or aliphatic hydrocarbons, for example benzene, toluene, xylene, p-cymene, p-diisopropylbenzene, cyclohexane, cyclooctane, n-hexane and n-butane, or unsaturated hydrocarbons, such as ethylene, propylene and butylene. These diluents may be used on their own or mixed together.

It is preferable to allow the Lewis acids to react with the isobutylene polymers containing halogen atoms prior to the beginning of the grafting reaction. It is also possible however to carry out the reaction of the Lewis acids with the isobutylene polymers containing halogen atoms side by side with the grafting reaction.

It is possible by regulating the reaction temperature, the amount and type of Lewis acid and by means of additives to vary the molecular weight of the unsaturated graft polymer formed. In general graft polymers having a particularly high content of grafted-on 1,3-diene are obtained at low temperatures.

Unsaturated graft polymers prepared according to the new process have a solid tough consistency. They are practically colorless and are soluble in many solvents practically without the formation of gel. Catalyst components containing aluminum may be hydrolyzed in the usual way by water or alcohols and washed out of the polymers with alkaline reagents.

The new unsaturated graft polymers can be vulcanized very easily because of the relatively high content of double bonds. They may be vulcanized in the usual way and with conventional vulcanizing agents, for example with mercaptothiazoline, mercaptobenzothiazole and its derivatives, dithiocarbamates, thiurams, dithiomethanes and xanthates, and in vulcanized form, if desired after adding suitable fillers, particularly carbon black, titanium dioxide or diatomaceous earth, may be widely used as vulcanized rubbers.

The new rubbers require only very small amounts of conventional antioxidants for stabilization; about 0.1 to 0.2% by weight of stabilizers is generally adequate with the new graft polymers, whereas it is necessary to stabilize conventional rubbers based on homopolymers of butadiene or copolymers of 1,3-dienes with styrene or acrylonitrile against the action of light, oxygen and heat with antioxidants in amounts of about 1.0 to 2.5% by weight.

The following examples further illustrate the invention. The parts specified are parts by weight. K values are determined according to H. Fikentscher, "Cellulose-Chemie," 1932, page 58 and in 0.5% solution in toluene unless stated otherwise.

Example 1

4 parts of aluminum chloride is added to a solution of 30 parts of brominated polyisobutylene having a K value of 76 and a bromine content of 2.3% by weight in 270 parts of toluene in a stirred vessel and then at −30° C. 20 parts of butadiene, 0.5 part of diethyl aluminum chloride and 0.1 part of cobalt (II) acetylacetonate are metered in.

The reaction period is twenty hours. The product is worked up conventionally. 43 parts of a graft polymer is obtained whose K value is 89 and whose polydiene content has 1,4-cis structure to the extent of 85%.

Example 2

The procedure of Example 1 is followed but butadiene is replaced by isoprene. 39 parts of a graft polymer is obtained whose K value is 86 and whose polydiene fraction has 1,4-cis structure to the extent of 58%.

Example 3

30 parts of a chlorinated butyl rubber having a K value of 82.5 whose chlorine content is 9.2% by weight and whose isoprene content is 5.8% by weight is dissolved in a stirred vessel in 570 parts of a mixture of equal parts of n-hexane and toluene, and then 3 parts of titanium tetrachloride is added and the whole is allowed to react at 0° C. for three and a half hours. 2 parts of triethyl aluminum, 20 parts of butadiene and 0.6 part of cobalt (II) acetylacetonate is then metered in.

After a reaction period of 25 hours, 42 parts of a graft polymer is obtained having a K value of 94.

Examples 4 to 18

The procedure of Example 3 is followed but the titanium tetrachloride is replaced by the same weight of the Lewis acids given in the following table. The amounts of graft polymer obtained (GP, in parts) and the K values (KV) obtained are also given in the table.

| Example No. | Lewis acid | GP | KV |
|---|---|---|---|
| 4 | Zirconium oxychloride | 41 | 78 |
| 5 | Titanium tetrabromide | 43 | 95 |
| 6 | Titanium tetraiodide | 46 | 98 |
| 7 | Aluminum tribromide (half weight) | 49 | 80 |
| 8 | Perchloric acid | 34 | 85.5 |
| 9 | Zirconium oxychloride | 41 | 89 |
| 10 | Tin tetrachloride | 46 | 102 |
| 11 | Niobium pentachloride | 44 | 93 |
| 12 | Tantalum pentachloride | 45 | 93 |
| 13 | Vanadium tetrachloride | 48 | 101.5 |
| 14 | Molybdenum tetrachloride | 42 | 94 |
| 15 | Palladium (II) hydrochloride | 35 | 85 |
| 16 | Gold (III) hydrochloride | 39 | 87 |
| 17 | Platinum (IV) hydrobromide | 33 | 87.5 |
| 18 | Iron (III) chloride | 38.5 | 89 |

Example 19

In a stirred vessel 970 parts of a mixture of 120 parts of p-diisopropylbenzene and 850 parts of pentane, 20 parts of aluminum tribromide and 4 parts of triethylaluminum are added at −10° C. to 30 parts of brominated butyl rubber having a K value of 79, a bromine content of 17.5% by weight and a content of 5.6% by weight of polymerized isoprene units. 2.3 parts of chromium (III) acetylacetonate and 30 parts of butadiene are then metered in. After a reaction period of thirty hours at −35° C., 42 parts of a graft polymer having a K value of 96.5 is obtained whose polydiene fraction has been incorporated to the extent of about 65% by 1,2-combination.

We claim:

1. A process for producing unsaturated graft polymers by grafting 1,3-dienes onto isobutylene polymers which comprises: reacting a halogenated isobutylene polymer having at least 80% by weight of isobutylene units in its backbone and having a halogen content of from 0.001 to 50% by weight with 0.001 to 5% by weight of a Lewis acid based on the weight of said isobutylene polymer and thereafter reacting the reaction product of said halogenated isobutylene polymer and Lewis acid with at least one 1,3-diene in the presence of 0.0001 to 5% by weight of a Ziegler-Natta catalyst based on the weight of said isobutylene polymer, said Lewis acid comprising at least one material selected from the group consisting of metal halides and metal oxyhalides and said Ziegler-Natta catalyst comprising a component A selected from the group consisting of alkyl aluminum compounds and alkyl aluminum halides and a component B selected from the group consisting of transition metal halides and acetyl acetonates.

2. A process as in claim 1 wherein said 1,3-diene is selected from the group consisting of butadiene, isoprene and chloroprene.

References Cited

UNITED STATES PATENTS

| | | | |
|---|---|---|---|
| 2,824,055 | 2/1958 | Lampe et al. | 260—880 XR |
| 3,012,000 | 12/1961 | Aries | 260—879 |

FOREIGN PATENTS

| | | |
|---|---|---|
| 817,684 | 8/1959 | Great Britain. |
| 825,882 | 12/1959 | Great Britain. |
| 878,150 | 9/1961 | Great Britain. |

OTHER REFERENCES

Minoura et al.: Journ. Polymer Science, vol. 4, No. 7, part A-1, pp. 1665–1681, July 1966, pp. 1665–1671 and 1673–1680 specifically relied upon.

GEORGE F. LESMES, Primary Examiner

U.S. Cl. X.R.

260—5, 41.5, 88.1, 88.2, 875, 877